United States Patent Office 3,411,980
Patented Nov. 19, 1968

3,411,980
IN-SITU RESIN ADHESION OF REINFORCING ELEMENT-TO-RUBBER
Richard Leshin, Akron, Ohio, assignor to The Goodyear Tire & Rubber Company, Akron, Ohio, a corporation of Ohio
No Drawing. Filed Mar. 26, 1965, Ser. No. 443,168
9 Claims. (Cl. 161—183)

ABSTRACT OF THE DISCLOSURE

Discloses rubber and reinforced rubber structures wherein the rubber is modified with a resin formed in-situ resulting from the reaction of a methylene acceptor such as resorcinol and a methylene donor reactable therewith. The donors include alpha (hydroxymethyl) substituted aldehydes, and an N-[alpha (hydroxymethyl) substituted alkylidene]-N-(hydrocarbon substituted) amine.

---

This invention relates to improvements in the method of adhering rubber to the surface of a reinforcing element and particularly to those reinforcing elements made of wire, regenerated cellulose, polyamides, polyesters and polycarbonates.

It is well known to use rubber in the manufacture of pressure hose, drive belts, and pneumatic tires, but when used in this manner it is necessary to reinforce the rubber with a textile material such as cotton, rayon, nylon, etc. Maximum reinforcement of the rubber is obtained when maximum adhesion is produced between the rubber and the reinforcing element. Cotton is easily adhered to rubber but the bonding of rayon is more difficult and nylon, polyester, and polycarbonate is even more difficult to bond to rubber because of the relatively smooth condition of the surface of the nylon and the polyester reinforcing element. This bonding problem is solved to a degree by the use of a resorcinol-formaldehyde-rubber latex (R/F/L) adhesive applied to the reinforcing element from a water solution. A bond is then formed between the R/F/L adhesive on the reinforcing element and the rubber after the rubber has been subjected to vulcanization temperatures.

With the advent of the polyester and polycarbonate fibers, it was necessary to develop a better adhesive system and attempts were made by adding resin forming reactants to the rubber which would react to form a resin in-situ. However, it was soon observed that just any resin may not be used but only those resin in-situ systems that do not destroy the desirable physical properties of the vulcanized rubber and of the reinforcing fiber especially after the rubber and the fiber have been subjected to aging.

In working with nylon as the reinforcing agent, considerable promise was shown in producing a strong bond between the nylon and the rubber when the rubber was first compounded with resorcinol and hexamethylenetetramine. With the introduction of the polyester cord and the polycarbonate cord as a reinfrcing element for rubber, these adhesive systems were not functional under all conditions of use especially when used in pneumatic tires run at relatively high speeds. Other problems arise in connection with rayon and with nylon.

It has now been discovered that methylene donors, capable of generating methylene groups in the presence of a methylene acceptor to form a resin and a nitrogenous compound, the compound being relatively inert toward the fiber, will not only develop a satisfactory bond between the rubber and the fiber but also minimize degradation of the fiber to rubber laminate without interfering with the development of desirable physical properties in the rubber especially after the rubber has been subjected to heat aging.

One class of methylene donors, that may be used in forming the in-situ resin in the rubber being bonded to the surface of the reinforcing agent, are made by reacting a higher aldehyde containing at least one replaceable alpha hydrogen with at least one mole equivalent of formaldehyde and not more moles than the number of replaceable alpha hydrogens per mole of the higher aldehyde. The higher aldehydes may be represented by the structural formula RR'CHCHO wherein R and R' may be hydrogen or lower alkyl (1–8C), phenyl, naphthyl and other aryl radicals. The resulting methylol compounds are referred to as alpha (hydroxymethyl) aldehydes having the characteristic linkage

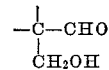

and which form resins in-situ with methylene acceptors.

The alpha (hydroxymethyl) aldehydes in turn may be reacted with a hydrocarbon (3–20C) primary amine (R"NH$_2$) to form an N-[alpha (hydroxymethyl) substituted alkylidene]-N-(hydrocarbon substituted) amine. These amines are also known as Schiff bases having the characteristic linkage

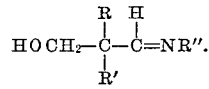

The aldehydes and the amines useful in this invention may be represented by what is believed to be the general structural formula having the following grouping of atoms:

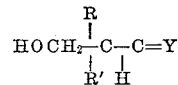

wherein Y is oxygen or NR", R and R' being hydrogen or methylol, or lower alkyl (1–8C), phenyl or naphthyl and R" being a hydrocarbon radical such as alkyl (3–20C), cycloalkyl (3–20C) or aralkyl (3–20C) wherein the carbon of the hydrocarbon radical attached to the nitrogen is also attached to at least two other carbons. An example of an aldehyde believed to correspond to the general formula:

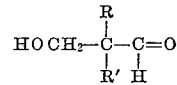

is trimethylol acetaldehyde (also known as tris (hydroxymethyl) acetaldehyde, also pentaerythrose). Other examples include dimethylol acetaldehyde, 3-hydroxy propionaldehyde, 2,2-dimethylolpropionaldehyde, and 2-ethyl-2-methylol butyraldehyde. Examples of Schiff bases believed to have the general formula

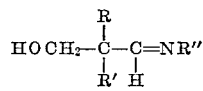

include:

N-[2,2,2-tri (hydroxymethyl) ethylidene] cyclohexylamine
N-[2,2,2-tri (hydroxymethyl) ethylidene] ter, ter-octylamine
N-[2,2,2-tri (hydroxymethyl) ethylidene] ter-butylamine
N-[2,2,2-tri (hydroxymethyl) ethylidene] isopropylamine
N-[2,2,2-tri (hydroxymethyl) ethylidene] 2-aminopentane
N-[2,2,2-tri (hydroxymethyl) ethylidene] 2-aminohexane
N,N'-bis [2,2,2-tri (hydroxymethyl) ethylidene] p-menthanediamine The alpha (hydroxymethyl) aldehydes may be prepared by reacting the desired aldehyde with formaldehyde. Pentaerythrose is prepared by reacting 3 moles of formaldehyde with one mole of acetaldehyde. One mole of formaldehyde reacted with one mole of isobutyraldehyde produces 2-(hydroxymethyl) isobutyraldehyde. Schiff bases may be prepared as noted above by refluxing a benzene solution of the desired amine with the desired aldehyde and removing the resulting water of reaction. The benzene may then be removed by distillation under vacuum, leaving the desired product as a non-distillable residue. The following example is exemplary of a new method of making an N-[alpha (hydroxymethyl) substituted alkylidene] amine.

EXAMPLE 1

The specific N-[alpha (hydroxymethyl) substituted alkylidene]-N-(hydrocarbon substituted) amine, N-[2,2, 2-tri (hydroxymethyl) ethylidene] ter-butylamine, is formed by refluxing 1 mole (134 parts) of pentaerythrose with 1.2 moles (87½ parts) of ter-butylamine in 400 parts of benzene for one hour with stirring. The water is removed azeotropically and remaining benzene removed under vacuum. The product remained as a partly yellow resin in an amount of 162 parts corresponding to 85.8% of theory.

Wherever the term lower alkyl radical (1–8C) is used it is meant to be methyl, ethyl, propyl (n- and iso-), butyl (n-, sec-, iso-, and tert-), amyl (n-, sec-, iso-, and tert-), hexyl, e.g., n-hexyl, sec-hexyl, 2,2-dimethyl-3-butyl, 2,2-dimethyl-4-butyl, 2,3-dimethyl-2-butyl, 2-methylpentyl, 2-methyl-2-pentyl, 3-methyl-1-pentyl, 3-methyl-2-pentyl, etc., heptyl, e.g., n-heptyl, sec-heptyl, 2,3-dimethyl-3-pentyl, 2,4-dimethyl-2-pentyl, 2,4-dimethyl-3-pentyl, 2,2, 3-trimethyl-3-butyl, 3-ethyl-2-pentyl, 2-methyl-hexyl, etc., octyl, e.g., n-octyl, 2-ethyl-hexyl, and diisobutyl. Other radicals include cycloaliphatic radicals; for example, cycloalkyl radicals, e.g., cyclopentyl, aikylated-cyclopentyl, e.g., mono- and polymethylcyclopentyl, cyclohexyl, and alklated cyclohexyl, e.g., mono- and polymethylcyclohexyl, mono- and polyethylcyclohexyl, mono- and polyisopropylcyclohexyl, mono- and polytertamylcyclohexyl, n-octylcyclohexyl, diisobutylcyclohexyl, ter, ter-octycyclohexyl, nonylcyclohexyl, diisoamlcyclohexyl, dodecyclohexyl, and hexadecylcyclohexyl. By aryl and aralkyl radicals is meant benzyl, methylbenzyl, diisobutylbenzyl, phenylethyl, phenylpropyl, phenyloctadecyl, naphthylmethyl, ter-amylnaphthylmethyl and naphthyl-ethyl.

A most important property exhibited by the methylene donors of this invention after they have reacted with a methylene acceptor to form the resin in-situ is the fact that the resulting products of the reaction do not degrade a polyester or a polycarbonate cord, particularly when the cord is embedded in the rubber and the laminate then subjected to high temperatures for prolonged periods of time particularly under those conditions that prevail when the laminate is used in the construction of a pneumatic tire which runs at high speeds and which in turn tends to generate large amounts of heat.

The polyester and polycarbonate fibers are of particular value in reinforcing rubber because of the quality of high strength possessed by these fibers even at high temperatures with little tendency to stretch as is the characteristic of other synthetic man-made fibers such as the polyamides. The polyester reinforcing fibrous structures are prepared from fiber-forming thermoplastic linear high molecular weight condensation polyester filaments and those polyesters made particularly from polyethylene terephthalate as well as polymers of cyclohexanedimethylene terephthalate. By linear terephthalate polyesters is meant a linear condensation polyester comprising recurring glycol dicarboxylate structural units in which at least about 85% of the recurring structural units are units of the formula

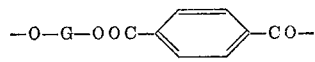

wherein G represents a divalent organic radical containing from about 2 to about 8 carbon atoms which is attached to the adjacent oxygen atoms by saturated carbon atoms. The terephthalate radical may be the sole dicarboxylate constituent of the recurring structural units or up to about 15% of the structural units may contain other dicarboxylate radicals such as adipate, sebacate, isophthalate, 4,4'-bibenzoate and hexahydroterephthalate. By high molecular weight is meant polyesters having an intrinsic viscosity of at least 0.4 and preferably 0.6 to 1.0 and as high as 1.5 as measured in a 60/40 phenol/tetrachloroethane mixed solvent at 30° C. Dacron T68 is an example of a commercially available polyester fiber which is a high melting, high molecular weight high tensile strength polyester, made of polyethylene terephthalate having an intrinsic viscosity of .85. In preparing the linear terephthalate polyester filaments useful in this invention and particularly best suited for reinforcing rubber through the formation of the in-situ resins described herein, the filaments are preferred to have a free carboxyl group concentration of less than about 65 equivalents per million grams of polyester and preferably less than about 20 equivalents. It is preferred that the polyethylene terephthalate and other similar polyesters have a high melting point which for polyethylene terephthalate is about 265° C. measured with a hot stage polarizing microscope. Generally the polyester fibers of this invention may be prepared in accordance with well known procedures for melt extrusion and drafting.

The polycarbonate polymers useful in making reinforcing fibers are those having properties similar to those described for the polyesters above and more particularly described in U.S. Patents 3,035,020, 3,030,331 and 3,000,-849. A specific fiber forming polycarbonate is one resulting from the reaction of phosgene and 4,4'-isopropylidenediphenol. Bisphenol C and bisphenol G may also be reacted with phosgene to form a fiber forming polycarbonate. The polycarbonate may also be referred to as poly (diesters) of carbonic acid and glycols. Conventional brass coated or bronze coated steel wire normally used in wire reinforced tires may be used in this invention.

The rubber component of the laminate of this invention may be any rubber that is a stretchable composition having a tendency to return to its approximate original shape after being vulcanized and particularly any rubber that is used in the manufacture of tires, drive belts or pressure hose. Thus the laminate of this invention may involve natural rubber otherwise known as Hevea Brasiliensis, or conjugated diene polymeric rubbers made by polymerizing butadiene-1,3, isoprene, 2,3-dimethyl butadiene-1,3, and mixtures of these conjugated dienes as well as copolymers of these diene monomers with up to 50% of compounds which contain a $CH_2:C:$ group and which are copolymerizable with butadiene-1,3, where for example, at least one of the valences is attached to an electronegative radical; that is, a radical which increases the polar character of the molecule such as vinyl, phenyl, nitrile and carboxy radicals. Examples of the diene rubbers are polybutadiene, stereospecific polybutadienes, particularly those with a cis-1,4 content of at least 90%, polyisoprene, stereospecific polyisoprenes, particularly those with a cis-1,4 content of at least 90%, butadiene/styrene copolymers also known as SBR, and butadiene/acrylonitrile copolymers also known as NBR.

The rubber being bonded to the reinforcing element in the presence of an in-situ resin will contain conventional compounding and vulcanizing ingredients such as carbon black, anti-oxidants, sulphur, zinc oxide, accelerators, and rubber processing and softening oils which may be added as such or may be prepared from oil-extended rubbers.

The laminate of this invention is prepared by coating the rubber which has been compounded in accordance with the disclosure set forth above onto a fabric of reinforcing fibers in the usual manner by calendering a coating of the vulcanizable rubber composition onto both sides of the fabric as is the conventional manner for coating a tire cord fabric with the tire carcass stock. The reinforcing fabric may be used without any previous treatment and under these conditions the fabric is known as grey cord indicating that no treatment in the form of an adhesive composition has been applied to the surface of the cord.

N-[alpha(hydroxymethyl) substituted alkylidene]-N-(hydro-carbon substituted) amines may also be prepared by reacting an alkylidene amine prepared in accordance with the method of Hurwitz U.S. 2,582,128 with mole equivalents of formaldehyde equal to and not more moles than the number of replaceable alpha hydrogens. Specifically one mole of N-(ethylidene)terbutylamine was slowly added to 3 moles of 37% aqueous formaldehyde at 10° C. and the mixture allowed to warm to 25° C. The yellow resinous product was dried under vacuum. This product produced the same results when used as a methylene donor as did the product of Example 1.

The following example illustrates the best mode in which the invention may be performed. All parts are by weight unless otherwise identified.

EXAMPLE 2

|  | Parts by Weight | |
|---|---|---|
|  | Amounts | Range |
| 1. Natural Rubber | 65 | 0-100 |
| 2. OE/SBR (styrene/butadiene-1,3 25/75 copolymer) (plus 37½ parts oil per 100 SBR) | 48.13 | 100-0 |
| 3. Carbon Black | 40 | 10-60 |
| 4. Zinc Oxide | 4 | 2-10 |
| 5. Stearic Acid | 2 | 1.5-3.0 |
| 6. Primary Accelerator (2,2'-dithiobisbenzothiazole) | 1.25 | .5-3.0 |
| 7. Secondary Accelerator (tetramethylthiuram disulfide) | .10 | .05-1.0 |
| 8. Sulphur | 2.5 | 1.0-5.0 |
| 9. Methylene Acceptor | (¹) | 1-10 |
| 10. Methylene donor (an alpha (hydroxymethyl) substituted acetaldehyde or a Schiff base as described herein) | (¹) | 1-10 |

¹ As noted.

In compounding the rubber stock in accordance with the formulation set forth above, a master batch of ingredients 1 and 2 is made with the carbon black in a mill at a temperature of about 110° C. The resulting carbon black master batch is then cooled and the remaining compounds are added to the batch in the order indicated above in a Banbury at a temperature of about 70° C. The control rubber was prepared in a similar manner except that a methylene acceptor and a methylene donor were not added. The mole ratio of acceptor to donor may range from 1/1 to 1/6 per 100 parts of rubber and preferably in such ratio, as to use up each resin-forming component in forming the resin in-situ.

The adhesion of the rubber compounds was measured at 250° F. by the hot "U" adhesion test after the cord was coated with the rubber compound under test and the assembly vulcanized for 15 minutes at 310° F. The pounds necessary to pull the adhered cord free from the rubber block is the hot "U" adhesion value. The following table shows the results that may be obtained in the practice of the present inventions TABLE I.—GREY CORD AS INDICATED EMBEDDED IN RUBBER AND VULCANIZED AT 310° F. FOR 15 MINUTES FOR POLYESTER AND RAYON AND VULCANIZED AT 275° F. FOR 80 MINUTES FOR NYLON CORD

| Examples | Acceptor¹ | Parts Per 100 Parts | Donor¹ | Parts Per 100 Parts | Hot "U" Adhesion Pounds | | | Cord Tensile After 6 Hours 300° F. lbs. |
|---|---|---|---|---|---|---|---|---|
|  |  |  |  |  | Nylon | Polyester | Rayon |  |
| 3 (Control) | None | 0 (None) | None | 0 | 3.2 | 1.6 | 1.8 | 39.2 |
| 4 (Control) | Res | 1.10 | HMTA | 2.90 | 12.2 | 8.0 | 19.1 | 11.5 |
| 5 | Res | 1.10 | PERR | 1.80 | 6.0 | 5.3 | 3.9 | 39.0 |
| 6 | Res | 1.10 | THEC | 1.80 | 5.0 | 4.4 | 3.2 | 33.0 |
| 7 | Res | 1.10 | THEB | 1.80 | 6.5 | 7.4 | 5.7 | 33.5 |
| 8 | Res | 1.10 | THEO | 1.80 | 5.1 | 4.7 | 6.0 | 34.5 |
| 9 | Res | 1.10 | THEP | 1.80 | 5.6 | 3.1 | 6.2 | 33.0 |
| 10 | MAP | 1.10 | PERR | 1.80 | 5.0 | 4.8 | 2.3 | 38.0 |
| 11 | MAP | 1.10 | THEB | 1.80 | 6.9 | 4.8 | 5.8 | 34.0 |
| 12 | MAP | 1.10 | THEP | 1.80 | 6.1 | 4.5 | 5.0 | 33.5 |

¹ SYMBOLS:
HMTA—Hexamethylenetetramine
PERR—Tris (hydroxymethyl) acetaldehyde
THEC—N-[2,2,2-tri (hydroxymethyl) ethylidene] cyclohexylamine
THEB—N-[2,2,2-tri (hydroxymethyl) ethylidene] ter-butylamine
THEO—N-[2,2,2-tri (hydroxymethyl) ethylidene] ter, ter-octylamine
THEP—N-[2,2,2-tri (hydroxymethyl) ethylidene] isopropylamine
MAP—m-Aminophenol
Res—Resorcinol In the examples in Table I above each of the methylene donors will produce an exceptional bond between the surface of the polyester and polycarbonate cords and the rubber, and the values shown are unexpected in view of the fact that no preliminary treatment with an adhesive composition was given to the polyester cord prior to its embedment in the rubber. It has also been observed that the methylene donors react favorably in the rubber to improve the physical properties of the rubber such as the 300% modulus, the ultimate tensile strength, the elongation, the hot rebound, the hot deflection, dynamic modulus, and of equal importance, without degrading the physical properties of the cords being bonded to the rubber and especially after heat aging in the case of the polyester and polycarbonate cords.

It is believed that the methylene donor undergoes a reversible reaction in the presence of heat to produce methylene either as formaldehyde or as methylene radical, which in turn is nascently reactable with the methylene acceptor to produce a resinous matrix throughout the body of the rubber while at the same time promoting desirable adhesion between the surface of the polyester cord and the rubber. In each instance the hydroxymethyl group on the carbon adjacent (also alpha to) the carbonyl function

or adjacent (also alpha to) the imine linkage

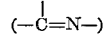

is the essential component which is believed to generate methylene under the heat of vulcanization to form the resinous matrix with the methylene acceptor.

Each of the methylene donors described above will form a resin in-situ in the rubber when reacted with any one or combination of the following methylene acceptors; resorcinol, m-aminophenol, resorcinol monoacetate, resorcinol diacetate and other m-disubstituted benzenes wherein the substituents may be hydroxyl (—OH), amino (—NH₂) or acetoxy (—OCOCH₃) radicals; as well as 1,5-naphthalenediol, phenol, and alpha and beta naphthol resins resulting from the partial reaction of the foregoing acceptors with formaldehyde. Other acceptors include o-disubstituted benzenes such as o-aminophenol, melamine and the partial reaction products of dicarboxylic acids such as phthalic, isophthalic and terephthalic acids, with phenols such as phenol, resorcinol, o-aminophenol, and m-aminophenol, and partial reaction products with urea, aniline, m-phenylenediamine and p-phenylenediamine.

Adhesion to the grey cord may be further improved if the cord is previously treated with conventional cord adhesives by passing the cord through an adhesive dip of an aqueous dispersion of a mixture comprising a phenol, an aldehyde and a rubber latex.

The rubber compositions containing the combination of methylene acceptors and donors of the type disclosed herein are particularly useful in the manufacture of pneumatic tires, pressure hose, and drive belts, wherein the rubber is subjected to severe forces to the extent that the rubber must be reinforced with a rubber reinforcing agent and the instant invention permits the use of polyester reinforcing agents which possess physical properties far superior to other reinforcing agents, particularly of the rayon and nylon type.

While certain representative embodiments and details have been shown for the purpose of illustrating the invention, it will be apparent to those skilled in this art that various changes and modifications may be made therein without departing from the spirit or scope of the invention.

What is claimed is:

1. A laminate of rubber and a reinforcing element, the rubber containing a methylene donor and a methylene acceptor capable of reacting with the methylene donor, the donor being selected from the group consisting of alpha (hydroxymethyl) substituted aldehydes resulting from the reaction of a higher aldehyde containing at least one replaceable hydrogen with at least one mole equivalent of formladehyde and not more moles than the number of replaceable alpha hydrogens per mole of the higher aldehyde, and an N-[alpha (hydroxymethyl) substituted alkylidene]-N-(hydrocarbon substituted) amine wherein the carbon attached to the nitrogen through a single bond is also attached to at least two other carbons.

2. The laminate of claim 1 wherein the donor is a product resulting from the reaction of an alpha (hydroxymethyl) substituted aldehyde resulting from the reaction of a higher aldehyde containing at least one replaceable hydrogen with at least one mole equivalent of formaldehyde and not more moles than the number of replaceable alpha hydrogens per mole of the higher aldehyde, and a hydrocarbon (3–20C) primary amine.

3. The laminate of claim 1 wherein the donor is the reaction product of pentaerythrose and cyclohexylamine.

4. The laminate of claim 1 wherein the donor is the reaction product of pentaerythrose and ter-butylamine.

5. The laminate of claim 1 wherein the donor is the reaction product of pentaerythrose and ter, ter-octylamine.

6. The laminate of claim 1 wherein the donor is the reaction product of pentaerythrose and isopropylamine.

7. The laminate of claim 1 wherein the donor is the reaction product of pentaerythrose and p-menthanediamine.

8. In the method of adhering a reinforcing element to rubber by applying a vulcanizable rubber coating to said element and heating the assembly to vulcanize the rubber, the step which comprises incorporating in at least the portion of the assembly adjacent the interface of the element and rubber coating before vulcanization, a methylene donor and a methylene acceptor capable of reacting with the methylene donor, the donor being selected from the group consisting of alpha (hydroxymethyl) substituted aldehydes resulting from the reaction of a higher aldehyde containing at least one replaceable hydrogen with at least one mole equivalent of formaldehyde and not more moles than the number of replaceable alpha hydrogens per mole of the higher aldehyde, and an N-[alpha (hydroxymethyl) substituted alkylidene]-N-(hydrocarbon substituted) amine wherein the carbon attached to the nitrogen through a single bond is also attached to at least two other carbons.

9. An assembly of a reinforcing element and a vulcanized rubber composition containing an in-situ resin formed resinous reaction product of a m-disubstituted benzene wherein the substituents are selected from the group consisting of —OH, —NH$_2$ and —OCOCH$_3$ and a methylene donor being selected from the group consisting of alpha (hydroxymethyl) substituted aldehydes resulting from the reaction of a higher aldehyde containing at least one replaceable hydrogen with at least one mole equivalent of formaldehyde and not more moles than the number of replaceable alpha hydrogens per mole of the higher aldehyde, and N-[alpha (hydroxymethyl) substituted alkylidene] - N - (hydrocarbon substituted) amine wherein the carbon attached to the nitrogen through a single bond is also attached to at least two other carbons.

References Cited
UNITED STATES PATENTS

| | | | |
|---|---|---|---|
| 2,263,387 | 11/1941 | Houk et al. | 260—51.5 X |
| 2,272,783 | 2/1942 | Treboux | 260—51.5 X |
| 2,331,323 | 10/1943 | Jahant | 152—356 |
| 2,385,374 | 9/1945 | Rhodes | 260—30 |
| 2,417,975 | 3/1947 | Ebers | 260—51.5 X |
| 2,437,710 | 3/1948 | Rhodes | 260—51.5 X |
| 2,823,188 | 2/1958 | Novak | 161—233 |
| 2,859,186 | 11/1958 | Boresch | 260—51.5 X |
| 2,884,394 | 4/1959 | Silver | 161—233 X |
| 2,922,729 | 1/1960 | Dereich | 156—331 X |

HAROLD ANSHER, *Primary Examiner.*